(12) United States Patent
Bloom et al.

(10) Patent No.: US 10,466,702 B1
(45) Date of Patent: Nov. 5, 2019

(54) DUAL INDEPENDENT AUTONOMOUS AGENT ARCHITECTURE FOR AIRCRAFT

(71) Applicant: Rockwell Collins, Inc., Cedar Rapids, IA (US)

(72) Inventors: Nicholas H. Bloom, Marion, IA (US); Matthew P. Corbett, Mount Vernon, IA (US); Timothy R. Fannin, Urbana, IA (US); Eric N. Anderson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 102 days.

(21) Appl. No.: 15/896,976

(22) Filed: Feb. 14, 2018

(51) Int. Cl.
*G05D 1/00* (2006.01)
*G06F 19/00* (2018.01)

(52) U.S. Cl.
CPC ......... *G05D 1/0088* (2013.01); *G05D 1/0055* (2013.01)

(58) Field of Classification Search
CPC .................. G05D 1/0088; G05D 1/0055
USPC ............................................. 701/3
See application file for complete search history.

(56) References Cited

U.S. PATENT DOCUMENTS

| 4,995,040 A * | 2/1991 | Best ............... G06F 11/184 714/797 |
| 6,625,749 B1 * | 9/2003 | Quach ............ G06F 11/1641 712/220 |
| 7,055,060 B2 * | 5/2006 | Nguyen .......... G06F 11/1641 714/11 |
| 10,320,575 B2 * | 6/2019 | Toillon ................ H04L 12/10 |
| 2004/0186979 A1 * | 9/2004 | Janke .............. G06F 9/30189 712/1 |
| 2009/0055674 A1 * | 2/2009 | Mueller .......... G06F 9/30181 713/375 |
| 2010/0217408 A1 * | 8/2010 | Esch ................ H04L 1/0061 700/79 |

* cited by examiner

*Primary Examiner* — Tan Q Nguyen
(74) *Attorney, Agent, or Firm* — Suiter Swantz pc llo

(57) ABSTRACT

An aircraft computer system includes segregated processing elements, each executing an autonomous agent. Each autonomous agent receives a set of data pertaining to aircraft events and processes the data to identify a set of instructions for resolving the event. Each autonomous agent then compares all competing solutions to determine if each autonomous agent agrees; if so, the solution is implemented, if not, the disparity is resolved either automatically via a voting algorithm or with the intervention of a human decision maker.

17 Claims, 3 Drawing Sheets

DUAL INDEPENDENT AUTONOMOUS AGENT ARCHITECTURE FOR AIRCRAFT

BACKGROUND

Aircraft generally include two decision makers tasked with responding to events. Some events that occur during aircraft operations cannot be addressed by automated, deterministic systems, either onboard or on ground. As reduced crew or no crew aircraft operations become more common, autonomous systems will be tasked with responding to these events. The probabilistic nature of autonomous systems makes it very difficult and potentially impossible to certify a single system for safe operation in the civil aviation. Additional protections into the avionics or through additional safety bounds between the autonomous system and the system control outputs may mitigate the issue; however, this greatly limits the ability of the autonomous system to match the responses and safety record of human flight crews when confronted with unexpected events.

Consequently, it would be advantageous if an apparatus existed that is suitable for allowing autonomous aircraft operations with the same versatility and reliability of current multi-crew operations.

SUMMARY

In one aspect, embodiments of the inventive concepts disclosed herein are directed to a computer system with segregated processing elements, each executing an autonomous agent. Each autonomous agent receives a set of data pertaining to an event and processes the data to identify a set of instructions for resolving the event (a solution). Each autonomous agent then compares all competing solutions to determine if each autonomous agent agrees; if so, the solution is implemented, if not, the disparity is resolved either automatically via a voting algorithm or with the intervention of a human decision maker.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
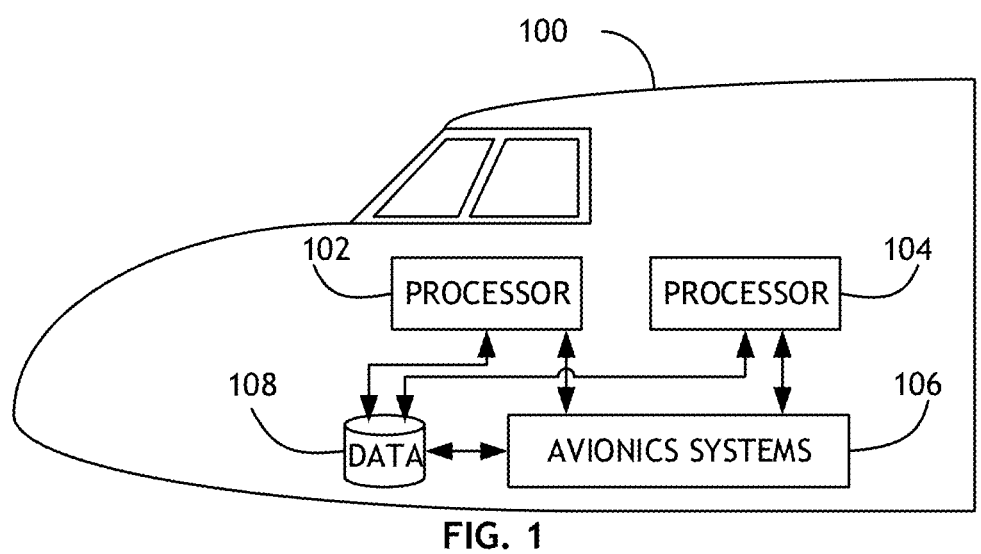
FIG. 1 shows an environmental block diagram of an aircraft including a system for implementing embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a computer system with segregated processing elements, each executing an autonomous agent that receives a set of data pertaining to an event and processes the data to identify a solution.

Referring to FIG. 1, an environmental block diagram of an aircraft 100 including a system for implementing embodiments of the inventive concepts disclosed herein is shown. The system includes two or more processing elements 102, 104, either separate processors or processing cores within one or more processors. Each processing element 102, 104 is in data communication with avionics systems 106 (which may comprise an automated response system) and one or more data storage elements 108. The avionics systems 106 include navigation and control systems, sensors, and data collection systems. The avionics systems 106 provide data to the one or more data storage elements 108.

Each processing element 102, 104 executes an autonomous agent configured to analyze data from the one or more data storage elements 108 and interact with avionics systems 106 to implement a processor determined solution to an event defined by the data. Such events may include, for example, a change request to a flight plan, or a loss of air data sensors due to icing during cruise level flight. Autonomous agents may fill many of the roles of pilots in current aircraft. Each processing element 102, 104 receives and analyzes a different, appropriately source selected subset of all available data to independently arrive at a solution. Each processing element 102, 104 communicates its solution to the other via a separate communication channel.

In at least one embodiment, autonomous agents are responsible for managing/monitoring specific tasks via independent interfaces during the operation of the aircraft. Operationally, dividing specific tasks between the autonomous agents maintains the traditional roles of pilot flying and pilot not flying and also allows for easier integration with aircraft systems for both reduced crew and fully autonomous operations. Each autonomous agent is capable of supporting either flight deck role (or both) and a selection method (seniority, ping pong, dice rolls, human decides, etc.) is used to allocate the roles.

In at least one embodiment, the processing elements 102, 104 are segregated from each other to prevent direct data communication between the processing elements 102, 104.

In at least one embodiment, there are regular cross-comparisons between the autonomous agents to unify each autonomous agent's understanding of the state of the aircraft, the environment, and mission status. When an event occurs that changes any of these factors to be outside the bounds of a purely automated system to respond, the autonomous agents will independently assess the situation and generate the mission updates or commanded outputs needed by the automated systems. Separate analysis via segregated processing elements 102, 104 preserves the dual independent actor/decision maker methodology that currently provides redundancy in an aircraft cockpit, even in a highly automated environment with only a single pilot, or even in an autonomous unmanned vehicle.

Where each autonomous agent arrives at the same solution, the processing elements 102, 104 may implement that solution by manipulating the avionics systems 106. Where each autonomous agent arrives at a different solution, each processing element 102, 104 is prevented from implementing either solution until the disparity is resolved. In at least one embodiment, a human decision maker, such as a pilot or ground controller, must resolve any disparity in solutions proposed between the autonomous agents. Confirmation logic may primarily focus on ensuring that proposed actions do not significantly impact safety or other mission goals (in a prioritized order) relative to available alternatives. In at least one embodiment, each autonomous agent may execute a voting algorithm or other decision making algorithm to resolve the disparity once both solutions are known; or alternatively, to present a proposed resolution to a human decision maker. In at least one embodiment, proposed actions that are objected to may be re-assessed by the proposing autonomous agent, incorporating the fact of the objection, the reason for the objection and an alternative action provided by the reviewing autonomous agent.

Reassessed proposed actions from the proposing autonomous agent will be communicated, via a communication element, to the reviewing autonomous agent and carried out as long as they do not require disabling any part of an automated system response designed to protect the aircraft. Reassessed actions from the proposing autonomous agent that require disabling all or part of the automated system response designed to protect the aircraft will only be carried out if both autonomous agents agree that an emergency condition exists or if the proposing autonomous agent has determined that an emergency condition exists and there is no communication from the reviewing autonomous agent. The automated system may also have additional conditions applied (like an active warning condition or Air Traffic Control/Airline concurrence) before they will allow either or both autonomous agents to disable deterministic protections.

In the example of icing during cruise level flight, each autonomous agent may evaluate sensor readings and determine that airspeed has dropped significantly despite no changes to the airplane's attitude or thrust. Each autonomous agent evaluates alternative data sources with similar results and independently determines a series of actions needed to resolve the event. The proposed actions differ but neither autonomous agent proposes bypassing automated protections. The reviewing autonomous agent does not object to the proposing autonomous agent's proposal (i.e. the proposal does not significantly impact safety or other mission goals) so the proposing autonomous agent passes the needed updates to the automated response system.

Each processing element 102, 104 implements the determined solution via commands from the processing elements 102, 104 to one or more avionics systems 106. In at least one embodiment, Confirmed actions will be carried out by the autonomous agent that proposed them or by the autonomous agent responsible for the managing the specific task.

Figure 2:
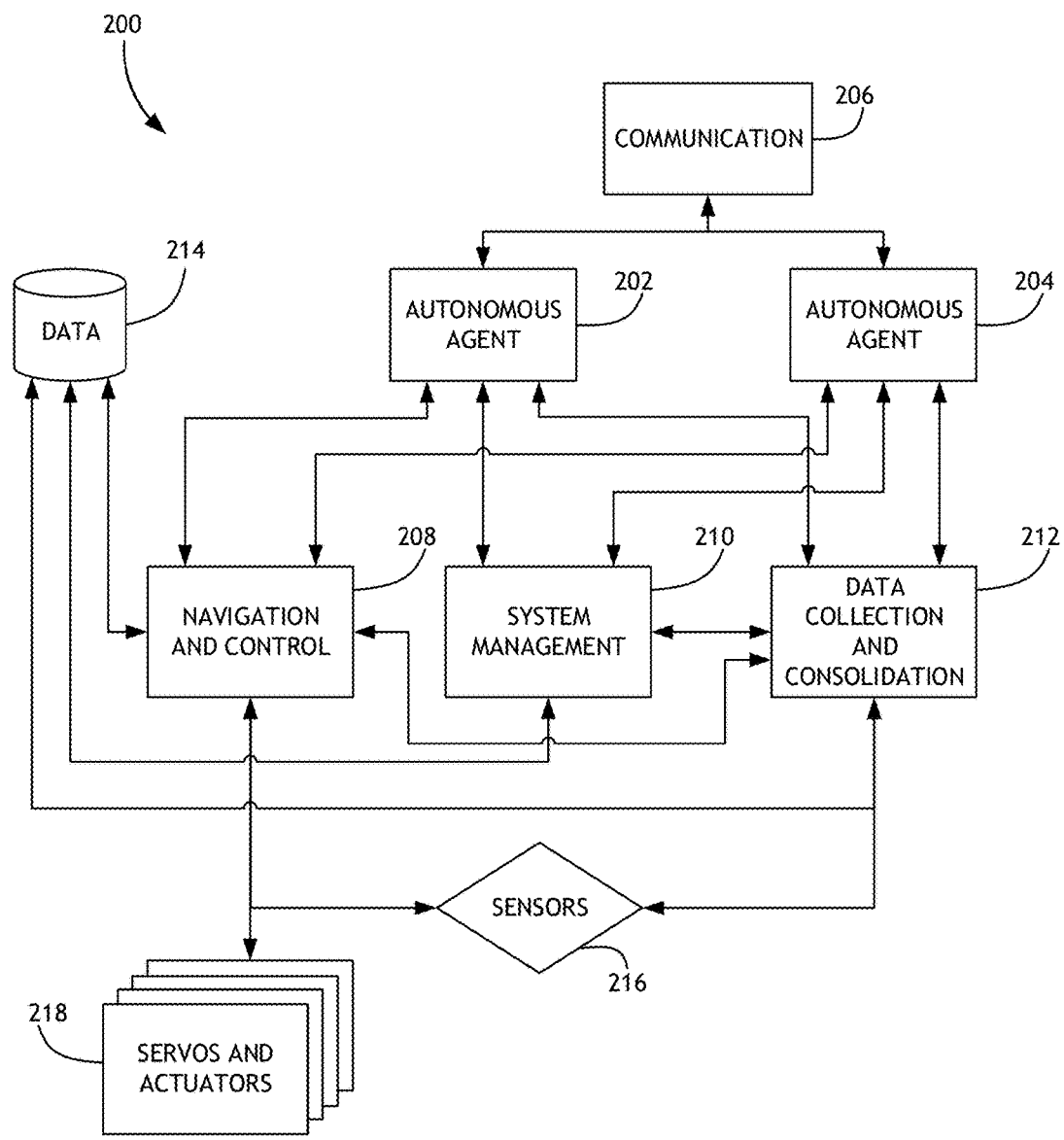
FIG. 2 shows a block diagram of a system for implementing embodiments of the inventive concepts disclosed herein.

Referring to FIG. 2, a block diagram of a system 200 for implementing embodiments of the inventive concepts disclosed herein is shown. The system 200 includes two or more autonomous agents 202, 204; each autonomous agent 202, 204 may be executed via a processor or processing core in a processor. Each autonomous agent 202, 204 may communicate with a communication element 206, such as a separate avionics communication system, but should not be configured for direct data communication. Segregating the autonomous agents 202, 204 to prevent direct data communication prevents the autonomous agents 202, 204 from developing an internal language among themselves. Further, the communication element 206 may be configured to record all data transfer to, from, and between each autonomous agent 202, 204 as a flight recorder. Likewise, each autonomous agent 202, 204 provides a monitorable interface.

Each autonomous agent 202, 204 is in data communication with avionics systems such as navigation and control systems 208, system management elements 210 for controlling data flow within the system 200, and data collection and consolidation systems 212. Each avionics system 208, 210, 212 may be in data communication with a data storage element 214. In at least one embodiment, the data collection and consolidation systems 212 receive data from one or more sensors 214 on board the aircraft and stores such data in the data storage element 214 for distribution to the two or more autonomous agents 202, 204, either directly or via an intermediary system management element 210 configured to distribute data to each autonomous agent 202, 204. Such distribution may be based on the originating sensor 216 or avionics system 208, 210, 212 of the data.

In at least one embodiment, the autonomous agents 202, 204 identify or are provided with an event requiring a decision or solution. Based on data received from the data collection and consolidation element 212 or system management elements 210, each autonomous agent 202, 204 produces a decision or solution such as through a trained neural network. Each decision or solution is communicated to the communication element 206 for cross-sharing between the autonomous agents 202, 204. Each autonomous agent 202, 204 determines if the other autonomous agent 202, 204 arrived at the same or substantially similar solution. If so, at least one of the autonomous agents 202, 204 may enact the solution via signals to the navigation and control systems 208 to actuate one or more servos or actuators 218 as necessary to control the aircraft according to the identified solution. Alternatively, if the autonomous agents 202, 204 arrive at disparate solutions, each autonomous agent 202, 204 may receive the solution produced by the other autonomous agent 202, 204 and analyze such alternate solution to determine if the autonomous agents 202, 204 can reach a consensus, such as through a voting algorithm. Alternatively, or in addition, each autonomous agent 202, 204 may be presented additional data from the data collection and consolidation element 212 or system management elements 210 not presented to such autonomous agent 202, 204 when each original solution was produced to determine if additional data produces a consensus.

In at least one embodiment, any consensus solution may require acknowledgement by a human overseer. In at least one embodiment, failure to reach a consensus may trigger all solutions to be presented to a human overseer. Within the context of the present disclosure, a human overseer may comprise a pilot or other crewmember, a flight controller, a ground controller, or other off-board individual.

Figure 3:
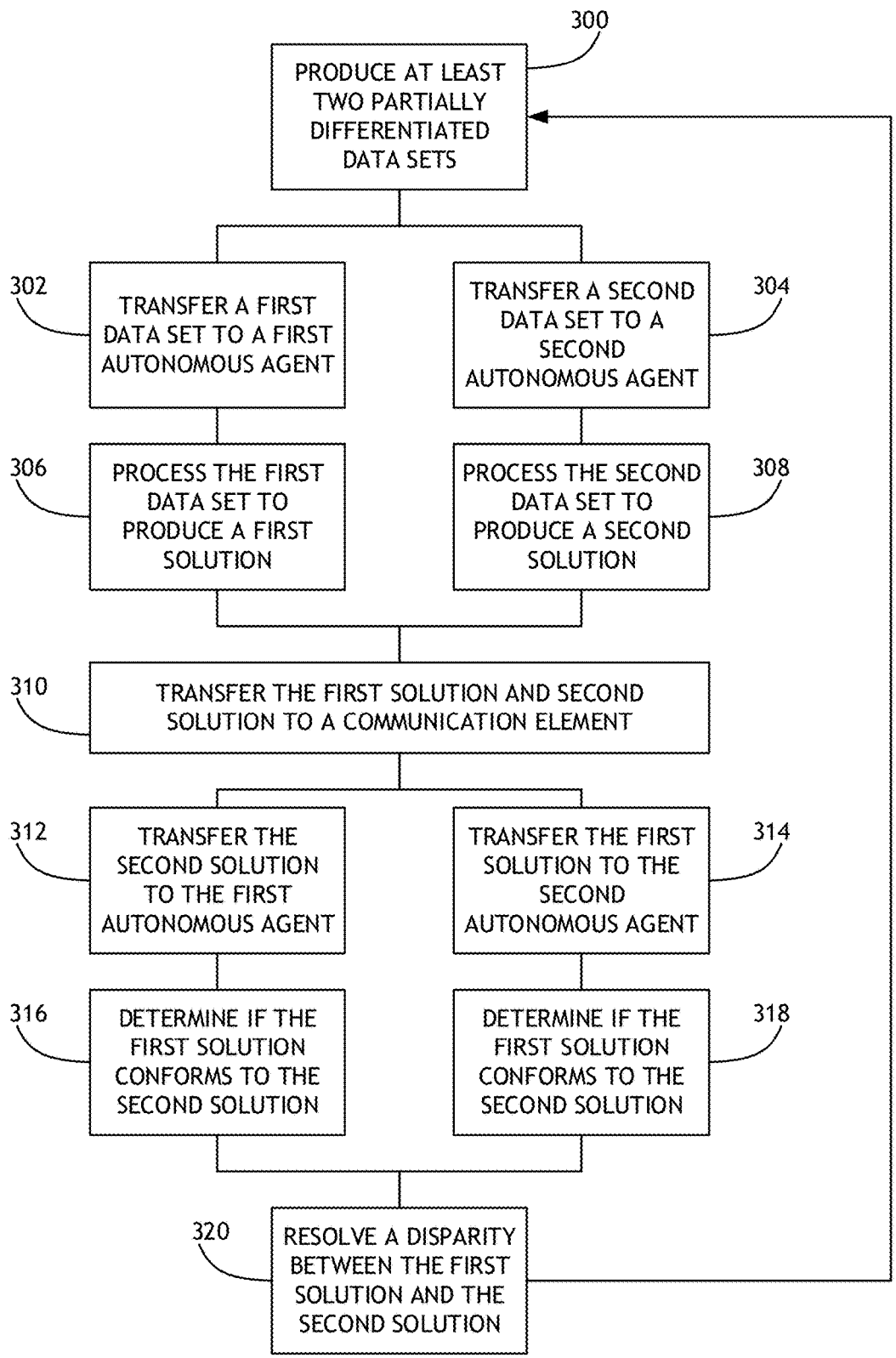
FIG. 3 shows a flowchart of a method according to the inventive concepts disclosed herein.

Referring to FIG. 3, a flowchart of a method according to the inventive concepts disclosed herein is shown. An aircraft computer system executing at least two autonomous agents produces 300 at least two partially or completely differentiated data sets based on data from on-board sensors, other on-board avionics systems, and remote sources such as ground stations or other aircraft. A first differentiated data set is transferred 302 to a first autonomous agent and a second differentiated data set is transferred 304 to a second autonomous agent. Separate, differentiated data sets ensure that the autonomous agents, which likely are based on similar decision making algorithms, will not simply perform identical analyses.

Each autonomous agent processes 306, 308 its corresponding data set to produce a solution to an event identified by avionics systems of the aircraft. Each solution is transferred 310 to a data communication element configured to moderate communication between the autonomous agents. Data communication between the autonomous agents is moderated to ensure all communication between the autonomous agents is transparent and they do not develop an internal language.

The solutions produced by each autonomous agent are transferred 312, 314, via the data communication element, to the alternative autonomous agent so that each autonomous agent may compare its own solution to the alternative solution and thereby determine 316, 318 if the solutions substantially match. If at least one of the autonomous agents determines 316, 318 that there is a disparity between the proposed solutions, the communication element may implement a voting algorithm or some other decision making mechanism via moderated communication between the autonomous agents. In at least one embodiment, the disparity may be resolved 320 by producing at least two new partially differentiated data sets and reprocessing 306, 308.

In at least one embodiment, once the autonomous agents agree on a solution, one or more of the autonomous agents issues commands necessary to actuate servos and actuators to implement the solution.

Under typical operating conditions, systems according to embodiments of the present disclosure operate an aircraft to meet mission goals, provide deterministic responses to events that occur during the mission, including automatically performing most checklist actions and providing guidance per the activated flight plan, and force cross-checking. Automated systems also include algorithms for tactical responses or interventions to events that can be addressed via deterministic means (Thrust Asymmetry Compensation during takeoff, TCAS and GCAS maneuvers, general envelope protection functions, etc.).

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least two processing elements, executing at least a first autonomous agent and a second autonomous agent;
   one or more avionics systems in data communication with each of the at least two processing elements; and
   one or more data storage elements in data communication with the at least two processing elements,
   wherein:
      the first autonomous agent is configured to:
         receive a first data set pertaining to an aircraft event;
         produce a first solution to the aircraft event; and
         compare the first solution to a second solution produced by the second autonomous agent;
      the second autonomous agent is configured to:
         receive a second data set pertaining to the aircraft event;
         produce the second solution to the aircraft event; and
         compare the second solution to the first solution produced by the first autonomous agent;
      at least one of the first autonomous agent and second autonomous agent determines that the first solution and the second solution are not substantially similar;
      the second autonomous agent is categorized as a reviewing agent, and is further configured to determine that the first solution does not adversely impact any safety protocols; and
      the first autonomous agent is further configured to implement the first solution.

2. The computer apparatus of claim 1, further comprising a communication element in data communication with the at least two processing elements, wherein the communication element is configured to moderate all communication between the first autonomous agent and the second autonomous agent.

3. The computer apparatus of claim 2, wherein:
the first autonomous agent is configured to receive the second solution via the communication element; and
the second autonomous agent is configured to receive the first solution via the communication element.

4. The computer apparatus of claim 1, wherein:
the first autonomous agent and second autonomous agent each implement a voting algorithm to select the first solution or the second solution.

5. The computer apparatus of claim 1, wherein the first data set and second data set are differentiated by data source.

6. The computer apparatus of claim 1, wherein:
the first autonomous agent is configured to manage a first set of aircraft tasks;
the second autonomous agent is configured to manage a second set of aircraft tasks; and
specific tasks comprising at least one of the first solution and second solution are implemented by the first autonomous agent and second autonomous agent based on whether the specific tasks correspond to the first set of aircraft tasks or the second set of aircraft tasks.

7. A method comprising:
receiving a first data set pertaining to an aircraft event by a first computerized autonomous agent;
producing a first solution to the aircraft event by the first computerized autonomous agent;
receiving a second data set pertaining to the aircraft event by a second computerized autonomous agent;
producing the second solution to the aircraft event by the second computerized autonomous agent;
receiving the first solution by the second computerized autonomous agent;
receiving the second solution by the first computerized autonomous agent;
comparing the first solution to the second solution by the first computerized autonomous agent and the second computerized autonomous agent;
determining that the first solution and the second solution are not substantially similar;
determining, via the second computerized autonomous agent, that the first solution does not adversely impact any safety protocols; and
implementing the first solution via the first computerized autonomous agent,
wherein the second computerized autonomous agent is categorized as a reviewing agent.

8. The method of claim 7, further comprising moderating all communication between the first computerized autonomous agent and the second computerized autonomous agent to prevent an internal language from developing.

9. The method of claim 7, further comprising:
implementing a voting algorithm to select the first solution or the second solution.

10. The method of claim 7, wherein the first data set and second data set are differentiated by data source.

11. The method of claim 7, further comprising:
distributing specific tasks comprising at least one of the first solution or the second solution to the first computerized autonomous agent and the second computerized autonomous agent,
wherein:
the first computerized autonomous agent is configured to manage a first set of aircraft tasks; and
the second computerized autonomous agent is configured to manage a second set of aircraft tasks.

12. A aircraft comprising:
a computer system comprising:
at least one processor in data communication with a memory storing processor executable code for configuring the at least one processor to:
at least two processing elements, executing at least a first autonomous agent and a second autonomous agent;
one or more avionics systems in data communication with each of the at least two processing elements; and
one or more data storage elements in data communication with the at least two processing elements,
wherein:
the first autonomous agent is configured to:
receive a first data set pertaining to an aircraft event;
produce a first solution to the aircraft event; and
compare the first solution to a second solution produced by the second autonomous agent;
the second autonomous agent is configured to:
receive a second data set pertaining to the aircraft event;
produce the second solution to the aircraft event; and
compare the second solution to the first solution produced by the first autonomous agent;
at least one of the first autonomous agent and second autonomous agent determines that the first solution and the second solution are not substantially similar;
the second autonomous agent is categorized as a reviewing agent, and is further configured to determine that the first solution does not adversely impact any safety protocols; and
the first autonomous agent is further configured to implement the first solution.

13. The aircraft of claim 12, further comprising a communication element in data communication with the at least two processing elements, wherein the communication element is configured to moderate all communication between the first autonomous agent and the second autonomous agent.

14. The aircraft of claim 13, wherein:
the first autonomous agent is configured to receive the second solution via the communication element; and
the second autonomous agent is configured to receive the first solution via the communication element.

15. The aircraft of claim 12, wherein:
the first autonomous agent and second autonomous agent each implement a voting algorithm to select the first solution or the second solution.

16. The aircraft of claim 12, wherein the first data set and second data set are differentiated by data source.

17. The aircraft of claim 12, wherein:
the first autonomous agent is configured to manage a first set of aircraft tasks;
the second autonomous agent is configured to manage a second set of aircraft tasks; and
specific tasks comprising at least one of the first solution and second solution are implemented by the first autonomous agent and second autonomous agent based on whether the specific tasks correspond to the first set of aircraft tasks or the second set of aircraft tasks.

* * * * *